US008808408B2

(12) United States Patent
O'Connor et al.

(10) Patent No.: US 8,808,408 B2
(45) Date of Patent: Aug. 19, 2014

(54) STABLE SUSPENSIONS OF BIOMASS COMPRISING INORGANIC PARTICULATES

(75) Inventors: Paul O'Connor, Hoevelaken (NL); Sjoerd Daamen, Barcelona (ES)

(73) Assignee: KiOR, Inc., Pasadena, TX (US)

( * ) Notice: Subject to any disclaimer, the term of this patent is extended or adjusted under 35 U.S.C. 154(b) by 0 days.

(21) Appl. No.: 13/196,584

(22) Filed: Aug. 2, 2011

(65) Prior Publication Data
US 2013/0000182 A1 Jan. 3, 2013

Related U.S. Application Data

(63) Continuation of application No. 12/377,387, filed as application No. PCT/EP2007/058466 on Aug. 15, 2007, now Pat. No. 8,715,377.

(30) Foreign Application Priority Data

Aug. 16, 2006 (EP) ..................... 06119040

(51) Int. Cl.
| | |
|---|---|
| C10L 1/00 | (2006.01) |
| C10B 53/02 | (2006.01) |
| C10G 11/18 | (2006.01) |
| C10G 1/08 | (2006.01) |
| C10L 5/44 | (2006.01) |
| C10L 1/32 | (2006.01) |
| C08L 97/02 | (2006.01) |
| C08L 1/02 | (2006.01) |

(52) U.S. Cl.
CPC .. *C10L 5/44* (2013.01); *Y02E 50/32* (2013.01); *C10G 11/18* (2013.01); *C10G 1/083* (2013.01); *Y02E 50/30* (2013.01); *Y02E 50/10* (2013.01); *C10G 1/08* (2013.01); *C10L 1/32* (2013.01); *C10G 2300/1014* (2013.01); *C08L 97/02* (2013.01); *C10G 2300/805* (2013.01); *C08L 1/02* (2013.01)
USPC .............................................. 44/308; 44/605

(58) Field of Classification Search
USPC ............. 44/457, 307, 308, 605; 585/408
See application file for complete search history.

(56) References Cited

U.S. PATENT DOCUMENTS

| | | | |
|---|---|---|---|
| 4,300,009 A * | 11/1981 | Haag et al. ................... 585/408 |
| 4,954,467 A | 9/1990 | Johnson et al. | |
| 5,427,762 A | 6/1995 | Steinberg et al. | |
| 5,643,414 A | 7/1997 | Johansson et al. | |
| 5,755,295 A | 5/1998 | Hayatdavoudi et al. | |
| 8,013,195 B2 * | 9/2011 | McCall et al. ................ 585/240 |
| 2003/0010297 A1 | 1/2003 | Strom et al. | |
| 2004/0123519 A1 | 7/2004 | Shigehisa et al. | |
| 2004/0192980 A1 | 9/2004 | Appel et al. | |
| 2005/0051054 A1 | 3/2005 | White et al. | |
| 2007/0118916 A1 | 5/2007 | Sorensen et al. | |
| 2008/0229657 A1 | 9/2008 | Senyk et al. | |
| 2009/0025277 A1 | 1/2009 | Takanashi | |

FOREIGN PATENT DOCUMENTS

| | | |
|---|---|---|
| CA | 1201080 * | 2/1986 |
| GB | 2310865 | 9/1997 |
| JP | 2001049031 | 2/2001 |
| JP | 2001503101 | 3/2001 |
| WO | 0170917 | 9/2001 |
| WO | 2005111306 | 11/2005 |
| WO | WO 2005/123881 * | 12/2005 |
| WO | WO2005/123881 A2 * | 12/2005 |
| WO | WO2005123881 * | 12/2005 |
| WO | 2006008657 | 1/2006 |
| WO | 2006076355 | 7/2006 |

OTHER PUBLICATIONS

Marques et al: "Titanium Dioxide/Cellulose Nanocomposites Prepared by a Controlled Hydrolysis Method", Compositis Science & Technology, Elsevier, vol. 66, No. 7-8, Jun. 2006, pp. 1038-1044, XP005334223 ISSN: 0266-3538.
Gevert BS et al: "Upgrading of Directly Liquefied Biomass to Transportation Fuels: Catalytic Cracking", Biomass, London, GB, vol. 14, No. 3, 1987, pp. 173-183.
Office Action dated Jan. 5, 2012 for co-pending U.S. Appl. No. 12/377,387, filed Feb. 13, 2009, 12 Pages.
Office Action dated Nov. 2, 2012 for co-pending U.S. Appl. No. 12/377,387, filed Nov. 13, 2009, 10 Pages.

* cited by examiner

*Primary Examiner* — James Goloboy
*Assistant Examiner* — LaTosha Hines
(74) *Attorney, Agent, or Firm* — Hovey Williams LLP

(57) ABSTRACT

Liquid suspensions are disclosed comprising a suspending medium, small particles of biomass, and small particles of an inorganic material. The inorganic material stabilizes the suspension, so that it may be transported by pipeline or tank car without developing a sediment.
The suspension may be used in manufacturing a bio-fuel.

25 Claims, No Drawings

STABLE SUSPENSIONS OF BIOMASS COMPRISING INORGANIC PARTICULATES

CROSS REFERENCE TO RELATED APPLICATION

This is a continuation of application Ser. No. 12/377,387, filed Feb. 13, 2009, which is based on PCT International Application No. PCT/EP 2007/058466, filed on Aug. 15, 2007 which claims priority from European Patent Application No. 06119040.1 filed Aug. 16, 2006, the entirety of each if the foregoing applications is hereby incorporated herein by reference.

BACKGROUND OF THE INVENTION

1. Field of the Invention

An important aspect of the economics of the use of biomass as a source of fuel or of specialty chemicals is the cost involved in transporting the biomass from the location where it is produced to the location where conversion to a fuel or to specialty chemicals takes place. It is desirable to provide a process for converting biomass at or near the place of production into a pumpable liquid so it may be transported in tank cars or a pipe-line.

The present invention provides a liquid composition of biomass suspended in a liquid suspension medium, further comprising small particles of an inorganic material.

Of particular importance is that these suspensions are stable, meaning that the solid and liquid phases do not separate within the time needed to store and transport the suspensions (for example via pipe-line, rail, or road transport) to a location where they can be further processed.

It is known from the paper industry to make suspensions of cellulose fibers and inorganic materials. These suspensions do not need to be stable. To the contrary, the cellulose fibers are precipitated from the suspension and need to make inter-fiber hydrogen bonds (also referred to as paper-making bonds).

It is known from GB 2 310 865 to mix a slurry of biomass material with catalytic particles and to subject the resulting slurry to pyrolytic conditions. The slurry is processed immediately following its preparation, so there is no need for the slurry to be stable.

The composition of the present invention may be transported, for example by pipeline, or in a tank car or tank truck. The composition may also be stored in tanks. The composition is particularly suitable for use in processes whereby the biomass material is converted to liquid or gaseous fuels and/or to the valuable specialty chemicals.

In a specific embodiment the inorganic particulates also possess a catalytic functionality, meaning that the subsequent conversion of the biomass may be performed under milder conditions (lower temperature and/or lower pressure and/or shorter time) than was heretofore the case, resulting in improved products and superior process economics.

In a specific embodiment, the biomass comprises polymeric material. More specifically, the polymeric material comprises cellulose or lignocellulose. In a preferred embodiment the polymeric material comprises both cellulose and lignocellulose.

2. Description of the Related Art

Biomass is produced in large volumes in agriculture and forestry. Many of these materials are intended for use as food products for human consumption, in animal feed, or other forms of valuable materials. For example, forestry products are used as construction materials in the form of lumber, plywood, paper and paper products and paper byproducts and the like.

Incidental to the production of agricultural and forestry products, the world produces vast quantities of agricultural and forestry waste. Examples include wood chips, saw dust, straw, corn husks, bagasse, and the like. Attempts have been made to convert these waste materials to useful products. In general, these waste materials are converted to products of low intrinsic value, such as compost.

Attempts to convert these materials to products of a higher value have met with limited success. For example, conversion of agricultural waste to ethanol by fermentation is a time-consuming and expensive process. Moreover, even the most sophisticated fermentation enzymes are only able to convert at most about 50 percent of the available material. The remaining 50 percent is immune to attack by fermentation enzymes and is sometimes referred to as "recalcitrant cellulose" for this reason.

An alternative to the above approach involves converting the biomass at the location where it is produced (plantation etc) into a liquid (via pyrolysis or hydrothermal upgrading) or a gas stream (gasification) and to process these streams further in an oil or bio refinery, making optimal use of the economy of scale.

Unfortunately, transporting gas is a difficult and costly task, while most of the bio-liquids produced from biomass via thermal means are instable, in the sense that they deteriorate over time in terms of viscosity and/or chemical composition.

It is therefore an object of the present invention to provide a new liquid composition that can be made from agricultural or forestry products, or waste materials from agriculture and forestry, and that is sufficiently stable for transportation to a centralized processing location. It is a further object of the present invention to provide a biomass composition that is more easily converted to liquid or gaseous fuel or to specialty chemicals than the biomass materials from which it is derived.

BRIEF SUMMARY OF THE INVENTION

The present invention relates to a liquid composition comprising a liquid suspension medium having suspended therein small particles of a biomass material and small particles of an inorganic material, said composition being stable.

These liquid compositions are stable in the sense that the solid and liquid phases do not separate within the time necessary to store and transport them (via pipe-line or road transport) to a location where they can be further processed.

The inorganic material may be inert, for example a salt of an alkali metal or earth alkaline metal. In an alternate embodiment, the inorganic material may have catalytic activity. Examples include clays, silicas, silica aluminas, zeolites, anionic clays, cationic layered materials, metal hydroxyl salts and the like.

In a specific embodiment, the biomass comprises polymeric material. More specifically, the polymeric material comprises cellulose and/or lignocellulose.

DESCRIPTION OF ILLUSTRATIVE EMBODIMENTS

The present invention relates to a stable liquid composition comprising biomass particles. The liquid composition may be produced at the location where biomass is harvested or where it is produced as a byproduct of, for example an agricultural process. The liquid compositions of the present invention are sufficiently stable to allow them to be transported to a processing plant where they may be subjected to further processing.

The liquid compositions of the present invention comprises a liquid suspension medium having suspended therein small particles of a biomass material and small particles of an inorganic material. Although these compositions require the transportation of the liquid suspension medium and of the particles of an organic material, the pumpability of these compositions improves the economics of transportation in such a way that it more than offsets the additional costs of transporting the liquid suspension medium and the inorganic material.

The liquid suspension medium preferably comprises water, an alcohol, or a carboxylic acid. For reasons of costs and availability, water-based liquid suspension mediums are preferred. Alcohol and carboxylic acid may be added to an aqueous liquid suspension medium so as to change its properties. Preferred alcohols for use herein include glycols, in particular ethylene glycol.

Before incorporation into the liquid composition, the biomass material is reduced to a particle size preferably in the range of from 3 mm to 50 micrometers, more preferably from 1 mm to 0.1 mm. Any suitable method may be used for reducing the particle size of the biomass material. The selection of the method will depend in part on the nature and hardness of the biomass material, the availability of specific forms of energy at the location where the biomass is produced or harvested, the desired particle size, and the like.

Suspensions of small particles of biomass material in a liquid to suspension medium tend to be unstable. Biomass particles may either settle to the bottom of such a suspension, or float to the surface, whereby a biomass-rich phase is created. As many biomass materials are rich in cellulose, the biomass-rich phase may solidify as a result of hydrogen bonding between the biomass particles. The mechanism of this process is not unlike that of papermaking from a suspension of cellulose fibers, Once solidified, the biomass cannot readily be brought back into suspension by agitation. In addition, biomass particles in the presence of water are subject to microbial deterioration.

It is therefore desirable to provide a way of increasing both the physical stability and the microbial stability of a liquid composition comprising biomass particles suspended in a liquid suspension medium. It has now been discovered that the presence of small particles of an inorganic material in such a liquid composition improves both the physical stability and the microbial stability of the composition.

The physical stability of the liquid composition may be determined by the following standardized stability test. A centrifuge tube is filled with the appropriate amount of suspension, as described in the manual of the equipment. The tube is closed with a stopper and the suspension is centrifuged for 10 min at 5000 rpm. Immediately after centrifuging, the tube is removed from the centrifuge and slowly turned upside down and back (5 times). Then the content of the tube is carefully emptied. The tube is visually examined for the presence of a layer of solid material left on the bottom. If no solid material is present on the bottom of the tube the suspension is considered to be stable. Therefore, the term "stable" as used herein is made with reference to this centrifuge test.

Even if the presence of the inorganic particles may not sufficiently improve the physical stability of the suspension, the coating of inorganic material onto the biomass particles may decrease the amount of hydrogen bonding that takes place between biomass particles. As a result, a suspension that has undergone phase separation may be restored by simple agitation.

The stability of the suspension may be further improved by the addition of an anti-flocculant. Anti-flocculants are charged materials that attach to the surface of a suspended particle. As a result the zeta-potential of the particle is increased, which reduces the probability of coagulation or agglomeration with other particles in the suspension, in general, any multivalent soluble ion is suitable as an anti-flocculant. Pyrophosphate is a suitable example.

An alternate method for further improving the stability of the suspension comprises the use of a surfactant material. Surfactant materials are often considered a special form of anti-flocculants, but their mechanism of action is different. Surfactant molecules are characterized by a polar head and a non-polar tail. The polar head may be ionic or non-ionic. The polar head will attach to the surface of a suspended particle, with the non-polar tail sticking out into the solvent. As a result the particle becomes hydrophobic. Preferred are low-cost surfactants, such as soaps.

Swelling agents promote the absorption of solvent molecules into the suspended particles. As a result of the swelling, the density of the suspended particle becomes closer to the density of the solvent, thereby reducing the tendency of the particles to settle or to float to the surface. Suitable swelling agents include acids and bases. The choice of swelling agent will depend on the nature of the inorganic particles, for compatibility reasons.

In a preferred embodiment, the biomass material comprises a polymeric material, more preferably cellulose and/or lignocellulose. More preferred are biomass materials that contain both cellulose and lignocellulose.

The inorganic material preferably is in crystalline or quasi-crystalline form. The purpose of the present invention may be achieved with an inorganic material that is an inert inorganic material. The term "inert" as used herein refers to materials that do not have a catalytic effect on a conversion reaction (such as pyrolysis or hydrothermal treatment) to which the composition may be subjected.

It is, however, desirable to use inorganic material that has catalytic properties in a subsequent conversion reaction. Examples of such materials include clays, silicas, silica aluminas, transition metal hydroxides, metal hydroxyl salts, zeolites, cationic layered materials, anionic clays, layered double hydroxides (LDHs), smectite clays, saponites, sepiolites, and mixtures thereof.

The present invention further provides a method for preparing a liquid composition of biomass suspended in a liquid suspension medium, said composition being stabilized by small particles of an inorganic material, said method comprising the steps of:

a. contacting particles of the biomass with the liquid suspension medium having dissolved therein precursor material to the inorganic particles in;
b. allowing the solution to coat and/or penetrate the polymeric material;
c. modifying the conditions to cause the formation of an inorganic particulate material from the precursor material.

Step c. may involve changing the pH, changing the temperature, evaporating part of the liquid suspension medium, changing the ionic strength, etc.

Preferably, the liquid suspension medium comprises water, and may further comprise an alcohol and/or a carboxylic acid. The liquid suspension medium may further comprise a swelling agent, for example a Bronstedt acid or a Bronstedt base. Suitable acids include mineral acids, such as hydrochloric acid, sulfuric acid, and phosphoric acid. Suitable bases include the hydroxides and carbonates of the alkali and earth alkaline metals. If the liquid suspension medium comprises a carboxylic acid, the swelling agent preferably is also an acid.

The biomass material preferably comprises a polymeric material, more preferably cellulose and or lignocellulose. The inorganic material is preferably in crystalline or quasi crystalline form.

In a specifically preferred embodiment, the biomass comprises cellulose and the inorganic material is a hydrotalcite like material. The hydrotalcite like material may conveniently be formed in situ. Accordingly, the present invention provides a method for preparing a cellulose-containing polymeric liquid suspension comprising small particles of an inorganic material, said method comprising the steps of:
a. providing a cellulose-containing polymeric material;
b. providing an aqueous solution of a divalent metal and a trivalent metal;
c. soaking the cellulose polymeric material with the aqueous solution;
d. initiating the formation of a microcrystalline inorganic material.

The preferred hydrotalcite like material is hydrotalcite itself. Accordingly, the preferred divalent metal in step b. is magnesium, and the preferred trivalent metal is aluminum. The microcrystalline inorganic material formed in step d. is preferably an anionic clay, and most preferably hydrotalcite.

In yet another embodiment the inorganic material is an inorganic oxide, such as alumina. Accordingly, the present invention provides a method for preparing a cellulose-containing polymeric liquid suspension comprising small particles of an inorganic material, said method comprising the steps of:
a. providing a cellulose-containing polymeric material, such as biomass;
b. providing an aqueous solution of a cation or anion of a metal capable of forming a particulate inorganic compound;
c. soaking the cellulose polymeric material with the aqueous solution;
d. initiating the formation of a precursor to a particulate inorganic compound;
e. aging to convert the precursor to the particulate inorganic compound.

In this embodiment, a preferred cation for use in step b. is $Al^{3+}$, and a preferred anion is aluminate ($Al_2O_4^{2-}$).

The liquid composition of the present invention may be used to produce a variety of useful materials. For example, it may be used in the preparation of a bio-oil, it may be converted to a binder material, or to a construction material.

The liquid composition may be transported by pipeline or road transport or rail transport to a central processing location. Further, the liquid composition may be used as a feedstock in processes whereby the biomass material is converted to liquid or gaseous fuels and/or to valuable specialty chemicals.

Examples of such a process include one of a variety of processes present in a traditional oil refinery, such as gasification, steam reforming, thermal cracking, coking, catalytic cracking, hydro-cracking, and hydro-processing. The inorganic material may he selected such that it functions as a catalyst in any of these processes.

The liquid composition of the present invention may be used as a feedstock in a fluid catalytic cracking unit. For this purpose, the cracking catalyst in the unit should have a low cracking activity, because biomass materials are much more prone to cracking than the traditional feedstocks derived from crude oil. For this reason, it may be desirable to feed the liquid composition into a low cracking activity zone of a fluid catalytic cracking unit. Examples of such low activity zones include the stripper and the regenerator of a traditional FCC unit.

What is claimed is:

1. A process for converting biomass to reaction products, the process comprising:
   (a) contacting biomass particles with an inorganic material having catalytic properties, the inorganic material including: 1) a zeolite, and 2) at least one of a sepiolite or saponite; and
   (b) converting the biomass particles to reaction products in the presence of the inorganic material,
   wherein said biomass particles comprises cellulose or lignocellulose.

2. The process of claim 1, wherein the inorganic material includes a sepiolite.

3. The process of claim 1, wherein the inorganic material includes saponite.

4. The process of claim 1, wherein the inorganic material includes a sepiolite and a zeolite.

5. The process of claim 1, wherein the inorganic material includes saponite and a zeolite.

6. The process of claim 1, wherein step (a) further includes mixing the biomass particles and the inorganic material in a liquid suspension medium.

7. The process of claim 6, wherein the liquid suspension medium includes water.

8. The process of claim 1, wherein step (b) further includes converting the biomass particles to reaction products via at least one process chosen from gasification, steam reforming, thermal cracking, coking, catalytic cracking, hydro-cracking, and hydro-processing.

9. The process of claim 1, wherein step (b) further includes converting the biomass particles to reaction products via a fluid catalytic cracking (FCC) process.

10. The process of claim 1, wherein the biomass particles includes cellulose and lignocellulose.

11. The process of claim 1, wherein the biomass particles includes cellulose.

12. The process of claim 1, wherein the biomass particles includes lignocellulose.

13. The process of claim 1, wherein the reaction products include liquid reaction products or gaseous reaction products.

14. The process of claim 1, wherein the reaction products comprise liquid reaction products and gaseous reaction products.

15. A process for converting biomass to reaction products, said process comprising the steps of:
    (a) contacting biomass particles with an inorganic material having catalytic properties, the inorganic material comprising: 1) a zeolite, and 2) a sepiolite; and
    (b) converting said biomass particles to reaction products in the presence of said inorganic material.

16. The process according to claim 15, wherein said biomass particles comprises cellulose or lignocellulose, or a combination thereof.

17. The process according to claim 15, wherein said biomass particles comprises lignocellulose.

18. The process according to claim 15, wherein the converting of step (b) comprises converting said biomass particles to reaction products via a fluid catalytic cracking (FCC) process.

19. A process for converting biomass to reaction products, said process comprising the steps of:

(a) providing a stable liquid composition, said stable liquid composition comprising a liquid suspension medium having suspended therein: 1) biomass particles, said biomass particles comprising cellulose or lignocellulose, or a combination thereof; and 2) an inorganic material having catalytic properties, said inorganic material comprising: i) a zeolite, and ii) at least one of a sepiolite or saponite; and (b) converting said biomass particles to reaction products in the presence of said inorganic material, wherein at least a portion of said inorganic material prevents hydrogen bond formation between at least a portion of said biomass particles to thereby prevent at least a portion of said biomass particles from solidifying in said stable liquid composition.

20. The process according to claim 19, wherein at least a portion of said inorganic material is coated onto at least a portion of said biomass particles.

21. The process according to claim 19, wherein the converting in step (b) comprises converting said biomass particles into reaction products via a fluid catalytic cracking (FCC) process.

22. The process according to claim 21, further comprising feeding said liquid composition into a low cracking activity zone of an FCC unit, wherein said low cracking activity zone comprises a stripper or a regenerator.

23. The process according to claim 19, wherein said liquid suspension medium comprises water.

24. The process according to claim 19, wherein said inorganic material comprises saponite.

25. The process according to claim 19, wherein said inorganic material comprises a sepiolite.

\* \* \* \* \*